United States Patent [19]

Fritz et al.

[11] Patent Number: 4,901,496

[45] Date of Patent: Feb. 20, 1990

[54] APPARATUS FOR ASSEMBLING TOGETHER TWO ROOF FRAMES, AT THE LEVEL OF THE RIDGE, FOR MAKING FRAMEWORKS AND STRUCTURES

[75] Inventors: Andre Fritz, Beinheim; Jean Gerlinger, Geudertheim, both of France

[73] Assignee: Bator S.A., Societe Anonyme, Reichstett, France

[21] Appl. No.: 224,705

[22] Filed: Jul. 27, 1988

[30] Foreign Application Priority Data

Jul. 27, 1987 [FR] France .................. 87 10719

[51] Int. Cl.$^4$ ............................................. E04C 1/24
[52] U.S. Cl. ................................ 52/578; 403/292; 403/363; 403/403; 403/382; 52/90; 52/639
[58] Field of Search ........... 52/574, 578, 90, 63, 52/639-643, 83; 403/205, 292, 294, 324, 296, 363, 382, 403

[56] References Cited

U.S. PATENT DOCUMENTS

| 272,627 | 2/1883 | Beattie ................... 52/639 |
| 457,418 | 8/1891 | Hodges ................... 52/643 |
| 491,288 | 2/1893 | De Lastelle ............. 52/644 |
| 3,255,769 | 6/1966 | Lloyd . | |

FOREIGN PATENT DOCUMENTS

| 1151201 | 1/1958 | France . |
| 2352202 | 12/1977 | France . |
| 2588586 | 4/1987 | France . |
| WO86/04104 | 7/1986 | PCT Int'l Appl. . |

Primary Examiner—James L. Ridgill, Jr.
Attorney, Agent, or Firm—Young & Thompson

[57] ABSTRACT

Assembly apparatus for the connection of two roof beams at the level of the ridge, for providing frames and structures, comprises two cast members (1, 1') identical to each other, each being disposed fixedly partially in the interior of the upper end of each roof beam (2, 2'). The cast member (1) is disposed head to tail with respect to the cast member (1') and the two members (1, 1') each have a protruding portion (3, 3') spaced a substantial distance from a recess (4, 4'). The protruding portion (3, 3') of each member (1, 1') engages in the recess (4', 4) of the other member (1, 1') to provide two connections (3, 4' and 3', 4) between the beams (2, 2'), these connections being disposed closely adjacent respective ends of the beams (2, 2') and coacting to ensure the assembly and securement of the roof beams (2, 2') by mere insertion.

10 Claims, 2 Drawing Sheets

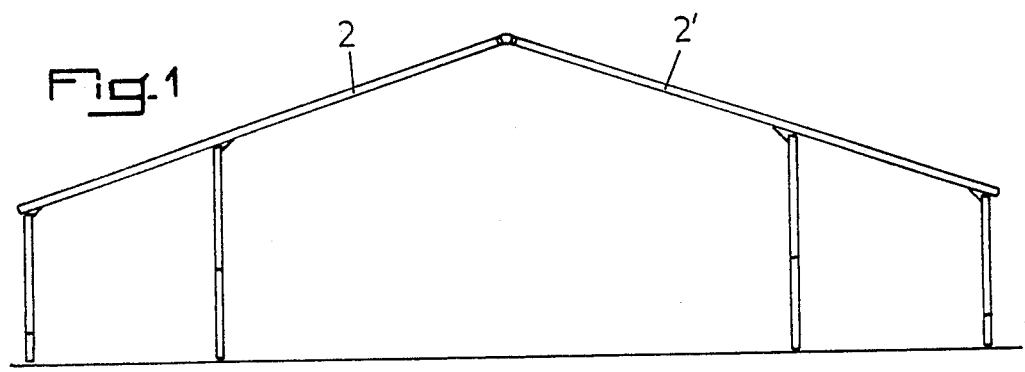
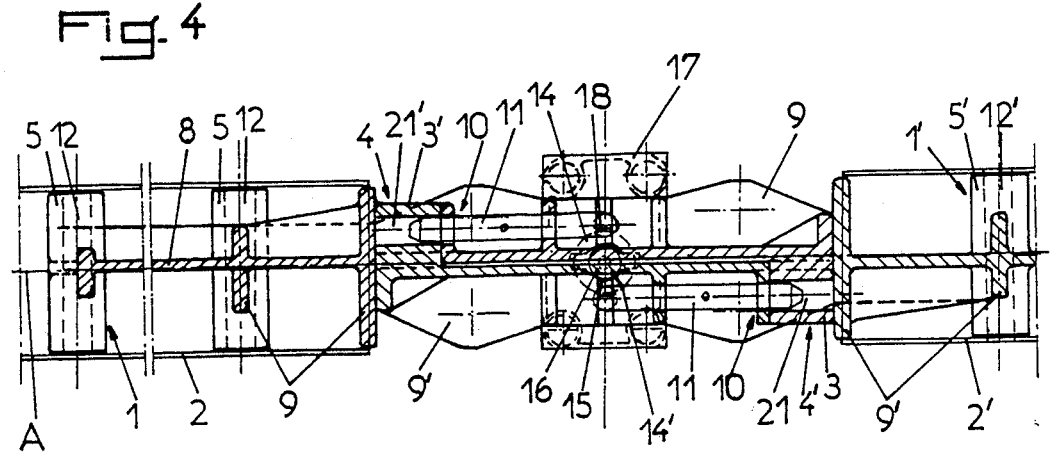
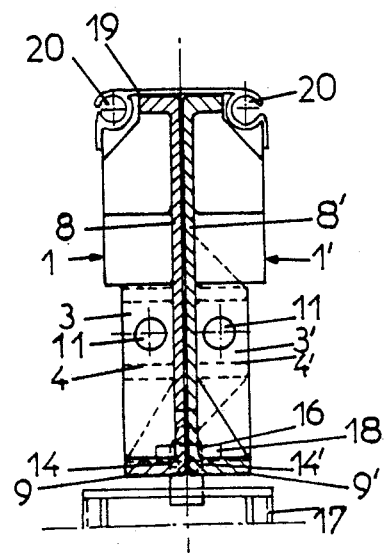

APPARATUS FOR ASSEMBLING TOGETHER TWO ROOF FRAMES, AT THE LEVEL OF THE RIDGE, FOR MAKING FRAMEWORKS AND STRUCTURES

The present invention relates to apparatus for the assembling together of two roof frames at the level of the ridge for making framework, and more generally of structures.

At present, for the production of a frame or of a structure, the assembling together of two roof frames at the level of the ridge can be effected only with various locking members such as bolts, dowels, screws, pins, etc . . . , and with uncast connection members.

It is therefore necessary, to effect such an assembly, to resort to a full set of tools and, if needed, to effect this operation with several workers, so as to position exactly the connection members simultaneously on the two roof beams. Such assembly therefore requires consideration time and investment in material and a relatively large number of people. Moreover, the connection members increase the weight of the framework or of the structure, as well as its volume.

Moreover, it happens that upon assembly, certain connecting or other members will be defective, which inevitably involves loss of time, and very often problems of security, because often the assemblers, in order to work quickly, will replace a defective piece with a piece designed for another use.

The overall problem to be resolved by the object of the present application, is to provide an assembly apparatus in which neither any connecting member nor any securement member is required. Moreover, this apparatus should be lighter and as small as possible (so as to provide easy storage and shipping), while having adequate safety during erection, each roof beam of the frame being generally assembled with the other roof beam on the ground, the assembly then being raised.

Such a device should permit a single person to effect the assembly of the two roof beams with each other with no tools (thus without risk of loss, simplification, savings of material . . . ), and with no connecting member to be secured during assembly so as to render the assembly more secure, to obtain simplification of mounting as well as a substantial saving of time. Finally, all these parameters coact, of course, to render such a mode of assembly much more economical than the known modes of assembly.

According to the present invention, the apparatus for assembling two roof frames together at the level of the ridge, to provide framework and structures, is characterized in that it consists of two cast members, identical to each other, each being disposed fixedly partially in the interior of the upper end of each roof beam, one of the two cast members being disposed head to tail relative to the other and the two members coacting to ensure the assembly and securement of the two roof beams by a simple insertion.

The invention will be better understood from the following description, which relates to a preferred embodiment, given by way of non-limiting example, and explained with reference to the accompanying schematic drawings in which:

FIG. 1 is an elevational view of a structure composed of a frame and various support posts;

FIG. 3 is a sectional view on the same scale as FIG. 2, on the line A—A of FIG. 2, and FIG. 4 is a sectional view, on the same scale as FIGS. 2 and 3, on the line B—B of FIG. 2.

Figure 2:
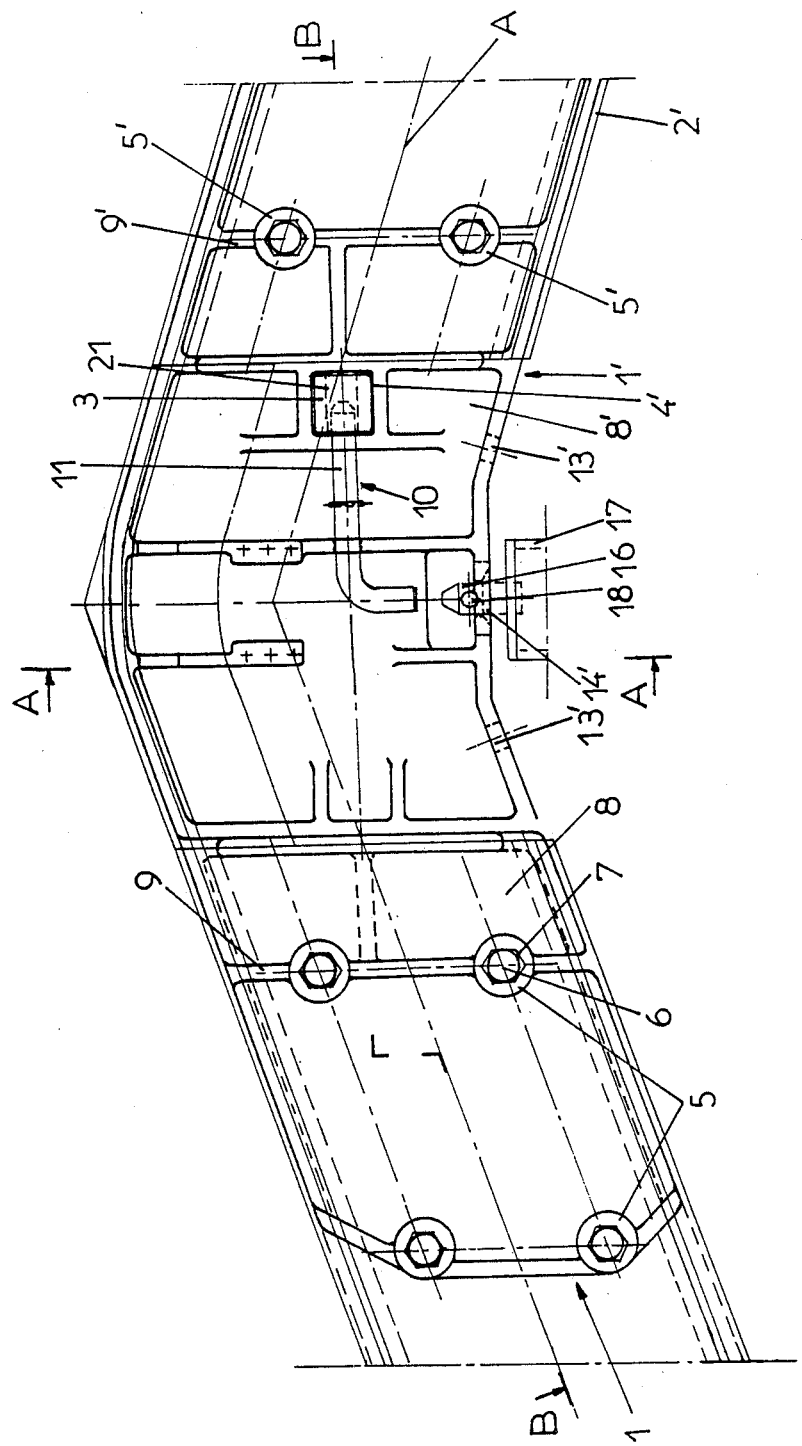
FIG. 2 is an elevational view on a larger scale than FIG. 1, of an assembly apparatus according to the invention and connecting two roof beams together.

According to the invention, the assembly apparatus consists of two cast members 1, 1', identical to each other, each being disposed fixedly partially in the interior of the upper end of each roof beam 2, 2', the cast member 1 being disposed head to tail relative to the cast member 1' and the two members 1, 1' coacting to ensure the assembly and securement of the two roof beams 2, 2' by simple insertion.

According to a first characteristic of the invention, each cast member 1, 1' comprises a boss 3, 3' and a hole 4, the size of the hole 4, 4' being very slightly greater than that of the boss 3, 3' so that the assembly of the two roof beams 2, 2' together can take place by inserting the boss 3 in the hole 4' and the boss 3' in the hole 4.

As can be seen in FIG. 2, each boss 3, 3' is located at an end of the cast member 1, 1', such that the insertion assembly boss 3-hole 4' is effected in the immediate proximity of the roof beam 2' and the insertion assembly of the boss 3'-hole 4 is effected in the immediate proximity of the roof beam 2.

This arrangement permits a maximum spacing of each insertion assembly from the other and thus ensures optimum rigidity and strength for each assembly.

According to FIGS. 2 to 4, each cast member 1, 1' comprises various supplemental bosses 5, 5' permitting maintaining the cast members 1, 1' in the roof beams 2, 2', the length of these bosses 5, 5' corresponding substantially to the thickness of the roof beams 2, 2'. These bosses 5, 5' serve to support a securement assembly, for example screw 6-nut 7, the screw 6 passing through the boss 5, 5' by an opening 12, 12', these bosses 5, 5' being moreover interconnected by a web 8, 8' located in the plane perpendicular to the central axes of the bosses 5, 5' and slightly offset relative to the axis of symmetry A of each roof beam 2, 2', and by ribs 9, 9' located for example in the plane passing through the central axes of the bosses 5, 5'.

Initially therefore, for example after the fabrication of the roof beams 2, 2', one inserts in the interior of the upper end of each roof beam 2, 2' a cast member 1'. Then these cast members 1' will be secured to the inside respectively of each roof beam 2, 2' by any known means such as bolts, dowels, screws, pins, etc.

In the use of these roof beams 2, 2', these will therefore already have been provided with cast members 1, 1'.

It is therefore necessary only, for assembly, that the bosses 3, 3' be inserted in the holes 4, 4' of the two cast members 1, 1'.

It will moreover be seen that the portion of the cast members 1, 1' located outside the roof beams 2, 2' will remain disposed in the interior of the nominal perimeter formed by the cross section of the roof beams 2, 2', which has the advantage of facilitating storage and transportation of said roof beams 2, 2'

Moreover, the construction of the cast members 1, 1' itself (web 8, 8', ribs 9, 9') has been conceived to obtain cast members 1, 1' as light as possible. These can preferably be of a light alloy, for example of aluminum.

According to another characteristic of the invention, and as shown in FIG. 2, the assembly apparatus may moreover be provided with at least one safety locking device 10, and preferably two of these devices 10, located each at the level of each inserted assembly 3–4' and 3'–4, in the form of a rod 11 which slides through openings in each cast member 1, 1' at the level of hole 4, 4', the end of the rod 11 being adapted to engage in an opening 21, 21' of each boss 3, 3' so as to block each inserted assembly 3–4' and 3'–4.

Such a locking permits among other things making the operation of effecting the assembled framework on the ground completely safe, the distance separating the two inserted connections being sufficient to ensure complete stability of the assembly and the bosses 5, 5' assuming substantially all of the force during the erection operation itself.

As shown in FIG. 2, the cast member 1' may be provided with two openings 13' permitting the passage of shuttering cables. The same is true for the cast member According to a further modification of the invention, the lower ribs 9, 9' forming the sole of each cast member 1, 1' are provided with a chamfered opening 14, 14' so that when the two cast members are disposed head to tail, the two openings 14, 14' mutually cooperate to provide a hole 15 through which can be engaged the axle 16 located at the top of the king post 17 and provided with a pin 18 permitting the blockage of said king post 17 to the ridge of the frame.

Finally, according to a last modification of the invention, each cast member 1, 1' is provided with a guide member 19 comprising a groove 20. This member 19 permits, thanks to the groove 20, the guidance of the tarpaulin supported by the frame. Thanks to the specific shape of each cast member 1, 1', that is the rounding at the level of the ridge, the cover slides easily in the groove 20 during assembly. The member 19 may for example be secured to each cast member 1, 1' by rivets.

Of course the invention is not limited to the embodiment described and shown in the accompanying drawings. Modifications remain possible, particularly as to the construction of the various elements, or by substitution of technical equivalents, without thereby departing from the scope of protection of the invention.

What is claimed:

1. Assembly apparatus for the connection of two roof beams at the level of the ridge, for providing frames and structures, characterized in that it consists in two cast members (1, 1') identical to each other, each being disposed fixedly partially in the interior of the upper end of each roof beam (2, 2'), the cast member (1) being disposed head to tail with respect to the cast member (1') and the two members (1, 1') each having a protruding portion (3, 3') spaced a substantial distance from a recess (4, 4'), said protruding portion (3, 3') of each member (1, 1') engaging in the recess (4', 4) of the other member (1, 1') to provide two connections (3, 4' and 3', 4) between the beams (2, 2'), said connections being disposed closely adjacent respective ends of said beams (2, 2') and coacting to ensure the assembly and securement of said roof beams (2, 2') by mere insertion.

2. Apparatus according to claim 1, characterized in that each said projection comprises a boss (3, 3') and each said recess comprises a hole (4, 4'), the size of the hole (4, 4') being sightly greater than that of the boss (3, 3') so that the assembly of the two roof beams (2, 2') together is effected by insertion of the boss (3) in the hole (4') and the boss (3') in the hole (4).

3. Apparatus according to claim 2, characterized in that each cast member (1 or 1') is slightly bent and comprises different supplemental bosses (5, 5') permitting maintaining the cast members (1, 1') in the roof beams (2, 2'), the length of these bosses (5, 5') corresponding substantially to the thickness of the roof beams (2, 2') and the bosses (5, 5') serving to support a securement assembly, for example screw (6)-nut (7), the screw (6) passing through the boss (5, 5'), through an opening (12, 12'), these bosses (5, 5') being moreover interconnected by a web (8, 8') located in the plane perpendicular to the central axes of the bosses (5, 5') and slightly offset relative to the axis of symmetry (A) of each roof beam (2, 2'), and by ribs (9, 9') located for example in the plane passing through the central axes of the boss (5, 5').

4. Apparatus according to claim 1 characterized in that the cast member (1') is moreover provided with two openings (13') permitting the passage of shuttering cables, as well as the cast member (1).

5. Apparatus according to claim 1 characterized in that the lower ribs (9, 9') forming the sole of each cast member (1, 1') are provided with a chamfered opening (14, 14') such that when the two cast members (1, 1') are disposed head to tail, the two openings (14, 14') coact to provide a hole (15) through which is adapted to engage an axle (16) located at the top of the king post (17) and provided with a pin (18) permitting the locking of said king post (17) to the ridge of the frame.

6. Apparatus according to claim 1 characterized in that each cast member (1, 1') is provided with a guide member (19) comprising a groove (20).

7. Apparatus according to claim 2, characterized in that it is moreover provided with at least one safety locking device (10).

8. Apparatus according to claim 7, characterized in that it comprises two locking device (10) each located at the level of each said connection (3-4') and (3'-4), in the form of a rod (1) which slides through openings in each cast member (1, 1') at the level of the hole (4, 4'), the end of the rod (11) being adapted to engage in an opening (21, 21') of each boss (3, 3') so as to lock up each inserted assembly (3-4') and (3'-4).

9. Apparatus according to claim 1 to 8, characterized in that the cast members (1, 1') are of a light alloy.

10. Apparatus according to claim 9, characterized in that the cast members (1, 1') are aluminum.

* * * * *